United States Patent Office 2,965,619
Patented Dec. 20, 1960

2,965,619

CROSS-LINKING OF FLUORINATED ELASTOMERS

Francis J. Honn, Bloomfield, and Willard M. Sims, Hackensack, N.J., assignors, by mesne assignments, to Minnesota Mining and Manufacturing Company, St. Paul, Minn., a corporation of Delaware No Drawing. Filed Apr. 3, 1953, Ser. No. 346,800

13 Claims. (Cl. 260—79.5)

This invention relates to the cross-linking of fluorinated, linear, saturated polymers and, more particularly, to the vulcanization of fluorinated, linear, saturated elastomers.

Linear or chain polymers are thermoplastic in nature. They exhibit continuous flow under the influence of heat and pressure. Such polymers can be resoftened as often as desired and are usually soluble in selected solvents. Some chain polymers are elastomeric in nature, that is to say, they stretch readily under external tension and retract rapidly and completely on release of tension.

Vulcanized or cross-linked elastomers may have equal, greater or lesser extensibility than the linear elastomers, depending on the number and nature of the cross-linkages. In any case, they have lessened plasticity and solubility and increased toughness and heat resistance.

Fluorinated thermoplastic resins have been found to be extremely useful in cases where chemical inertness, thermal stability and/or electrical insulation properties are desirable. Fluorinated elastomers are useful in any situation where elastomers are used and where chemical inertness and/or electrical insulation properties are desired. Many of these elastomers possess the additional advantage of retaining their elastomeric properties over a greater temperature range than previously known elastomers.

It is an object of this invention to cross-link fluorinated, linear, saturated elastomers.

It is a further object of this invention to prepare soft vulcanizates of fluorinated, linear, saturated elastomers of increased toughness and heat stability but unreduced or even superior extensibility.

It is a further object of this invention to produce hard thermosetting vulcanizates of fluorinated, linear, saturated elastomers.

It is a further object of this invention to reduce the solubility of fluorinated, linear, saturated elastomers produced by the copolymerization of at least two mono-olefinic compounds.

It is a further object of this invention to produce tough, chemically inert coatings from solutions of fluorinated, saturated, linear elastomers.

Other objects will appear hereinafter.

These and other objects are accomplished by the following invention. Linear elastomers comprising disordered, saturated, fluorinated carbon chains, and including a substantial number of carbon atoms which are linked only to hydrogen and to other carbon atoms, are reacted with a cross-linking agent at elevated temperatures to produce a vulcanized elastomer. Ordinarily, the linear elastomer is at least 10 percent comprised of —$CH_2$— groups.

Disorder in the linear, saturated, fluorinated carbon chains is ordinarily achieved by the copolymerization of at least two mono-olefinic compounds. In order to obtain chemical stability in the elastomer, at least one of the mono-olefinic compounds must be fluorinated. In order that the copolymer be elastomeric in nature, at least one of the mono-olefinic compounds must contain at least one carbon atom linked only to hydrogen and carbon atoms. At least 10 percent of the carbon atoms in the chain must be of this type in order to obtain an elastomeric product. Ordinarily, a mono-olefinic compound containing a $CH_2=$ group is used and this results in the linear chains containing —$CH_2$— groups. When the mono-olefinic compound contains an unsaturated chain of three or more carbon atoms, methyl groups may be present and these remain as side groups on the linear chain.

Among the fluorinated mono-olefinic compounds which may be used as comonomers to produce fluorine-containing elastomers are: $CF_2=CFCl$, $CF_2=CH_2$, $CF_2=CCl_2$, $CF_3—CF=CF_2$, $CF_2=CHCl$, $CF_3—CCl=CCl—CF_3$ $CF_2=CHF$, $CH_2=CFCl$, cis $CF_3—CH=CH—CF_3$, $CF_2=CF_2$ trans $CF_3—CH=CH—CF_3$

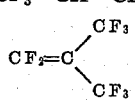

$CF_2=CFBr$, $CF_2=CCl—CF_3$, $CF_3—CH=CH_2$ and $CF_3—CCl=CCl_2$

These fluorinated mono-olefinic compounds may be copolymerized with each other, provided at least one of the comonomers contains at least one carbon atom bonded only to hydrogen and carbon atoms.

Among the copolymer systems which are particularly advantageous are the following:

| | |
|---|---|
| Vinylidene fluoride | 1,1-chlorofluoroethylene. |
| Vinylidene fluoride | Tetrafluoroethylene. |
| Vinylidene fluoride | Bromotrifluoroethylene. |
| Vinylidene fluoride | 2-chloroperfluoropropylene. |
| Vinylidene fluoride | Chlorotrifluoroethylene. |
| Difluorodichloroethylene (asym.) | Vinylidene chloride. |
| Perfluoropropylene | 1,1-fluorochloroethylene. |
| Trifluoroethylene | 1,1-fluorochloroethylene. |
| 1,1-fluorochloroethylene | 2-chloroperfluoropropylene. |
| Tetrafluoroethylene | 1,1-fluorochloroethylene. |

The copolymerization reaction may be carried out in either a water suspension type system or in a mass polymerization system. In the former system the reaction is preferably carried out at a temperature between about 0° C. and about 35° C. In a mass polymerization system the reaction is preferably carried out at a temperature between about —20° C. and about 0° C. With the water suspension type system a redox catalyst system is preferred. It has and contains an oxidant, a reductant and a variable valence metal salt. The oxidant in the water suspension type recipe is preferably an inorganic persulfate, such as potassium persulfate, sodium persulfate or ammonium persulfate, the latter being most desirable. The reductant is preferably a bisulfite, such as sodium bisulfite or potassium bisulfite, and preferably the former. The variable valence metal salt which is employed for the purpose of regenerating the oxidant is preferably in the form of an iron salt, such as ferrous sulfate or ferrous nitrate with ferrous sulfate being the most desirable variable valence metal salt.

In the mass polymerization system, organic peroxide promoters, and particularly halogen-substituted acyl peroxide are used. Trichloroacetyl peroxide is a preferred promoter of this type. Other halogen-substituted organic peroxides suitable for carrying out the polymerization are trifluoroacetyl peroxide, difluoroacetyl peroxide, 2,4- dichlorobenzoyl peroxide, chloroacetyl peroxide, trifluorodichloropropionyl peroxide, and dichlorofluoroacetyl peroxide.

By the method of this invention these rubbery copolymers may be transformed into soft vulcanizates of increased strength and toughness, of decreased solubility and of the same or increased extensibility or alternatively they may be transformed into hard vulcanizates which are thermosetting. The cross-linking agents used to produce the cross-linked elastomers of this invention may be of various types and may depend on any of several reactions to produce their cross-linking. In general, the cross-linking agents react to remove a hydrogen or halogen atom from a carbon atom on the polymer chain and thereby produce a free radical spot on the chain which is capable of linking to a similar free radical spot on another chain, either directly or indirectly. Among the cross-linking agents which may be used in this invention are the peroxy-type compounds, basic metal oxides and inorganic polysulfides. If desired, mixtures of the same or different types of cross-linking agents may be used.

The peroxy-type compounds include both organic and inorganic compounds which contain oxygen atoms directly linked to oxygen atoms. The peroxy-type compounds used in this invention must be stable below about 50° C. or else they will cause cross-linking while they are being blended into the copolymer. Among the organic compounds are the acyl and acoyl peroxides and hydroperoxides, such as ditertiary butyl peroxide, dilauryl peroxide, dibenzoyl peroxide, and ditertiary butyl hydroperoxide. The organic peroxy-type compounds also include peresters having either organic or inorganic peroxy oxygen. The former would include such compounds as alkyl and aryl perbenzoates. The latter would include alkyl and aryl persulfates.

Among the inorganic peroxy compounds are hydrogen peroxide and metal peroxides, such as lead peroxide, barium peroxide and zinc peroxide.

While it is not desired to be bound by any particular theory of operation, it is believed that the peroxy-type compounds remove a hydrogen atom from a carbon atom on the linear chain and thereby produce an activated free radical spot on the chain. This spot links directly to a similar free radical spot on another chain and thus produces a cross-linked polymer.

Among the basic oxides which may be used as linking agents are magnesium oxide, zinc oxide and lead oxide (PbO). It is believed that these basic acting compounds react with and remove a halogen atom from a carbon atom on the linear chain and produce a free radical spot on the chain. This free radical spot links directly to a similar spot on another chain and thereby produces a cross-linked polymer.

Among the inorganic polysulfides which may be used as linking agents are the alkali metal polysulfides and ammonium polysulfide. The generally accepted formula for a sodium polysulfide, for example, is $Na(S)_nNa$. It is believed that this compound breaks up into two sodium ions and a bivalent chain of sulfur atoms. Each of the sodium ions reacts with and removes a halogen atom from a linear polymer chain and leaves a free radical spot on the chain. Each end of the chain of sulfur atoms links to a free spot on a different polymer chain and thereby links the chains together.

The cross-linking reaction, with any of the above cross-linking agents, may require or may produce materials which have an adverse effect on the properties of the cross-linked polymer. For example, the metallic halides produced by the reaction of inorganic basic metal oxides with the halogen atoms of the polymer might reduce the chemical inertness and electrical resistance of the polymer. However, since relatively few cross-linkages are required to produce a substantial alteration in the characteristics of the polymer, relatively small amounts of cross-linking agents are required. In producing a cross-linked polymer for special processes where a high degree of chemical inertness or electrical resistance is required, conditions may be controlled so that a minimum of undesired material remains in the polymer.

There are several methods of reacting the linear elastomers with cross-linking agents, depending on the character of the elastomer, the character of the cross-linking agent and the character of the desired product. Cross-linking agents may be easily incorporated into the elastomers by mechanical mixing, either with or without plasticizers. Such mechanical mixing involves shearing forces and is carried out in equipment such as 2-roll mills, Banbury (internal) mixers and screw-type plasticators, which resemble extruders. Somewhat elevated temperatures of the order of from about 50° to about 100° C. ordinarily prevail in the mixing operation due to the mixing action itself and to the exothermic nature of the linking reaction. Articles to be molded are then heated in the mold with additional heat, as by hot air, steam or hot press platens, thereby shaping and cross-linking simultaneously. The temperature in the mold may range from about 120° C. to 200° C.

Since mechanical mixing generates heat and since it is difficult to blend other materials into a cross-linked polymer, it is usually desirable to blend other materials into the polymer first and then add the linking agent last, just before fabrication. Among the other materials which might be added to the aforesaid polymers prior to cross-linking are fillers, pigments and plasticzers.

With certain polymers and for certain uses, particularly for coatings, polymers may be cross-linked in solutions. The polymer and linking agent are dissolved in a suitable solvent, the solution is applied to a surface, such as a fabric or a metal, and then the coating is dried and heated to cross-link the polymer. In some cases, the coating is adherent and in other cases, it may be stripped off to form a self-supporting film of cross-linked polymer.

Still another method of cross-linking a linear polymer involves the use of a milky emulsion or "latex." As stated above, the copolymerization product of chlorotrifluoroethylene and vinylidene fluoride may be prepared in a water suspension type system. In such a system the product is removed from the reactors as a latex. For most purposes, the dry rubbery copolymer is recovered by coagulation of the latex with salts and acids followed by washing and drying. But for other purposes, such as dip coating and spraying, the latex can be used directly. In these cases, the other ingredients (fillers, cross-linking agents, etc.) are dispersed in water containing a surface-active agent, and these dispersions are blended with the latex. The latex is then applied as a coating to a surface (similar to the solutions disclosed above) and the polymer is cross-linked as the latex is dried and heated.

Still another method of reacting the linear elastomers with a cross-linking agent involves the reaction of the cross-linking agent with the elastomer in its fabricated state. Since this method involves the penetration of the elastomer by the reactant cross-linking agent, it is adaptable primarily to very thin sections of elastomer, such as in coatings or in self-supporting films. The coating or film is maintained in contact with the cross-linking agent, at elevated temperatures and preferably under pressure, for a period of time ranging from about one hour to several days. This results in the vulcanization of the elastomer and in the changing of the characteristics of the linked polymer to those of a space polymer.

*Example 1*

One hundred parts by weight of equimolar copolymer of chlorotrifluoroethylene and vinylidene fluoride, 15 parts by weight of a mixture of low molecular weight oily polymers of chlorotrifluoroethylene, as a plasticizer, and 15 parts by weight of benzoyl peroxide were thoroughly blended together on the cold rolls of a 2-roll mill. The blend was then press-cured for about one hour at 149° C. The cure was found to have converted the normally acetone-soluble copolymer into an insoluble product.

Example 2

One hundred parts by weight of a copolymer of chlorotrifluoroethylene and vinylidene fluoride, containing 62 mol percent of the former and 38 mol percent of the latter, 30 parts by weight of carbon black, 2 parts by weight of stearic acid and 3 parts by weight of sodium polysulfide were thoroughly blended together on the cold rolls of a 2-roll mill. The blend was then press-cured for about one hour at 171° C. The cure was found to have converted the normally acetone-soluble copolymer into an insoluble product.

The cross-linked halogenated elastomers prepared by this invention may be used for most of the purposes for which halogenated polymers generally have been used. These elastomers have essentially the same characteristics of chemical inertness and insulating ability as halogenated polymers, generally, and, in addition, have the toughness and resilience associated with a vulcanized elastomer. The cross-linked elastomers of this invention cannot be readily molded and cannot be put into solution after cross-linking. In a practical sense, however, in most cases, the cross-linking step can be performed as the final step in fabrication and thereby make subsequent solution or molding unnecessary.

Molded articles can be made, as described above, by heating and compressing a mixture of the linear elastomer and the cross-linking agent in a mold. The articles thus produced have all of the advantages of chemical inertness of the linear halogenated elastomer, at the same time, having greater toughness and better heat stability.

Films of cross-linked halogenated elastomers, formed in situ, may be used for the protection of metallic surfaces against corrosive conditions. Such films have substantially the same chemical inertness as the films of linear elastomer, but greater toughness and better heat resistance.

The cross-linked elastomers of this invention can also be used as wire coatings since the advantageous electrical properties of the halogenated elastomers are only slightly reduced in cross-linking by the production of by-product materials.

The cross-linked elastomers of this invention may also be used as impregnates and/or as coatings for yarns and fabrics, including the yarns and fabrics of asbestos, glass, synthetic resins and natural fibers.

We claim:

1. A cross-linked elastomer comprising linear copolymer chains containing only carbon, hydrogen and halogen atoms selected from at least one of the group consisting of fluorine, chlorine and bromine and containing at least 10 percent of its carbon atoms linked only to hydrogen and other carbon atoms, of an ethylenically unsaturated comonomer containing at least two fluorine atoms and a different monoolefinic comonomer containing not more than four carbon atoms which is at least half halogenated, said linear copolymer chains being cross-linked directly by a bond between a carbon atom of one chain and a carbon atom of another chain.

2. The cross-linked elastomer of claim 1 in which said ethylenically unsaturated comonomer is vinylidene fluoride.

3. The cross-linked elastomer of claim 1 in which said ethylenically unsaturated comonomer is chlorotrifluoroethylene.

4. The cross-linked elastomer of claim 1 in which said copolymer chains contain at least 10 percent $CH_2$ groups.

5. The cross-linked elastomer of claim 1 in which said copolymer chains contain at least 10 percent methyl side chains.

6. A cross-linked elastomer comprising linear copolymer chains containing only carbon, hydrogen and halogen atoms selected from at least one of the group consisting of fluorine, chlorine and bromine and containing at least 10 percent $CH_2$ groups, of vinylidene fluoride and a different monoolefinic comonomer containing not more than four carbon atoms which is at least half halogenated, said linear copolymer chains being cross-linked directly by a bond between a carbon atom of one chain and a carbon atom of another chain.

7. A cross-linked elastomer comprising linear copolymer chains containing at least 10 percent $CH_2$ groups of vinylidene fluoride and chlorotrifluoroethylene, said linear copolymer chains being cross-linked directly by a bond between a carbon atom of one chain and a carbon atom of another chain.

8. A cross-linked elastomer comprising linear copolymer chains containing only carbon, hydrogen and halogen atoms selected from at least one of the group consisting of fluorine, chlorine and bromine and containing at least 10 percent of its carbon atoms linked only to hydrogen and other carbon atoms, of an ethylenically unsaturated comonomer containing at least two fluorine atoms and a different monoolefinic comonomer containing not more than four carbon atoms which is at least half halogenated, said linear copolymer chains being cross-linked through sulfur atoms between a carbon atom of one chain and a carbon atom of another chain.

9. A cross-linked elastomer comprising linear copolymer chains containing at least 10 percent $CH_2$ groups of vinylidene fluoride and chlorotrifluoroethylene, said linear copolymer chains being cross-linked through sulfur atoms between a carbon atoms of one chain and a carbon atom of another chain.

10. The method for cross-linking a linear copolymer containing only carbon, hydrogen and halogen atoms selected from at least one of the group consisting of fluorine, chlorine and bromine and containing at least 10 percent of its carbon atoms linked only to hydrogen and other carbon atoms, of an ethylenically unsaturated comonomer containing at least two fluorine atoms and a different monoolefinic comonomer containing not more than four carbon atoms which is at least half halogenated, which comprises admixing said copolymer and a cross-linking agent selected from at least one of the group consisting of organic peroxides, metal peroxides, hydrogen peroxide, basic divalent metal oxides, and ammonium and alkali metal polysulfides which are stable below about 50° C. and cross-linking said copolymer in the presence of said cross-linking agent at an elevated temperature.

11. The process of claim 10 in which said copolymer contains at least 10 percent $CH_2$ groups.

12. The method of claim 10 in which said copolymer contains at least 10 percent methyl side chains.

13. The method for cross-linking a linear copolymer of vinylidene fluoride and chlorotrifluoroethylene containing at least 10 percent $CH_2$ groups which comprises admixing said linear copolymer and a cross-linknig agent selected from at least one of the group consisting of organic peroxides, metal peroxides, hydrogen peroxide, basic divalent metal oxides and ammonia and alkali metal polysulfides which are stable below about 50° C. and cross-linking said linear copolymer in the presence of said cross-linking agent at an elevated temperature.

References Cited in the file of this patent

UNITED STATES PATENTS

| | | |
|---|---|---|
| 2,456,255 | Coffman et al. | Dec. 14, 1948 |
| 2,479,367 | Joyce et al. | Aug. 16, 1949 |
| 2,495,286 | Brubaker | Jan. 24, 1950 |
| 2,752,331 | Dittman et al. | June 26, 1956 |